United States Patent
Zeiler

(10) Patent No.: US 11,276,317 B2
(45) Date of Patent: Mar. 15, 2022

(54) SYSTEM FOR CAREER TECHNICAL EDUCATION

(71) Applicant: David Zeiler, Irwin, PA (US)

(72) Inventor: David Zeiler, Irwin, PA (US)

(*) Notice: Subject to any disclaimer, the term of this patent is extended or adjusted under 35 U.S.C. 154(b) by 330 days.

(21) Appl. No.: 16/285,346

(22) Filed: Feb. 26, 2019

(65) Prior Publication Data

US 2020/0020241 A1 Jan. 16, 2020

Related U.S. Application Data

(60) Provisional application No. 62/698,333, filed on Jul. 16, 2018.

(51) Int. Cl.
| | |
|---|---|
| *G09B 5/12* | (2006.01) |
| *G09B 5/06* | (2006.01) |
| *G09B 9/00* | (2006.01) |
| *G06Q 50/20* | (2012.01) |
| *G06T 19/20* | (2011.01) |

(52) U.S. Cl.
CPC ........... *G09B 5/12* (2013.01); *G06Q 50/2057* (2013.01); *G06T 19/20* (2013.01); *G09B 5/06* (2013.01); *G09B 9/00* (2013.01)

(58) Field of Classification Search
None
See application file for complete search history.

(56) References Cited

U.S. PATENT DOCUMENTS

| | | | | |
|---|---|---|---|---|
| 5,791,907 A | * | 8/1998 | Ramshaw | G09B 23/285 434/262 |
| 5,831,584 A | * | 11/1998 | Socks | G06F 3/011 345/8 |
| 8,469,713 B2 | * | 6/2013 | Kron | G09B 5/065 434/238 |
| 9,679,495 B2 | * | 6/2017 | Cohen | G09B 7/00 |
| 2004/0111310 A1 | * | 6/2004 | Szlam | G06Q 30/018 705/317 |
| 2005/0053905 A1 | * | 3/2005 | Sadler | G09B 7/00 434/309 |
| 2008/0124698 A1 | * | 5/2008 | Ebensberger | G09B 11/10 434/365 |

(Continued)

*Primary Examiner* — William D Ermlick
(74) *Attorney, Agent, or Firm* — Daniel M. Cohn; Howard M. Cohn

(57) ABSTRACT

The System for Career Technical Education includes an education center that is interconnected through a server. Multiple user interface apparatuses communicate with the server through a data communication network. A computer database is connected to the server that stores gathered data from multiple users. A Learn phase module in which the education center presents online videos to the multiple user interface apparatuses via the data communication network to teach skills to the multiple users. An Apply phase module in which the education center enables the multiple users to apply the skills. A Create phase module in which the education center enables the multiple users to use the taught-and-applied skills to create a virtual reality experience within the server as proof of the user's mastery of the taught-and-applied skills. A certifying agency system connected to the server receives the proof of the user's mastery of the skills from the education center.

19 Claims, 3 Drawing Sheets

(56) References Cited

U.S. PATENT DOCUMENTS

| | | | |
|---|---|---|---|
| 2008/0166693 A1* | 7/2008 | Gifford | G09B 7/00 434/322 |
| 2009/0098524 A1* | 4/2009 | Walton | G09B 5/14 434/350 |
| 2009/0220929 A1* | 9/2009 | Daniel | G09B 9/02 434/362 |
| 2010/0048273 A1* | 2/2010 | Wallace | G09B 9/00 463/7 |
| 2010/0293478 A1* | 11/2010 | Dahlgren | G09B 5/00 715/758 |
| 2011/0117529 A1* | 5/2011 | Barash | G09B 23/288 434/265 |
| 2013/0183645 A1* | 7/2013 | Wallace | A42B 3/042 434/234 |
| 2013/0189656 A1* | 7/2013 | Zboray | G06F 3/012 434/219 |
| 2013/0189657 A1* | 7/2013 | Wallace | G09B 25/02 434/234 |
| 2013/0204942 A1* | 8/2013 | Agarwal | G09B 7/04 709/204 |
| 2013/0236870 A1* | 9/2013 | Wasserman | G09B 5/08 434/262 |
| 2014/0065584 A1* | 3/2014 | Wallace | G09B 5/00 434/234 |
| 2014/0162224 A1* | 6/2014 | Wallace | G09B 5/06 434/219 |
| 2014/0272869 A1* | 9/2014 | Hambelton | G09B 23/288 434/265 |
| 2015/0072323 A1* | 3/2015 | Postlethwaite | G09B 19/003 434/234 |
| 2015/0235565 A1* | 8/2015 | Postlethwaite | G09B 19/24 434/234 |
| 2015/0379894 A1* | 12/2015 | Becker | G09B 5/00 219/124.1 |
| 2016/0049085 A1* | 2/2016 | Beeson | G09B 19/003 434/234 |
| 2017/0046977 A1* | 2/2017 | Becker | B23K 9/0953 |
| 2018/0052512 A1* | 2/2018 | Overly | G06T 13/40 |
| 2018/0114455 A1* | 4/2018 | Brecknell | G06F 21/552 |
| 2018/0295419 A1* | 10/2018 | Thielen | H04N 21/44218 |
| 2019/0025905 A1* | 1/2019 | Godina | G05B 17/00 |
| 2019/0057106 A1* | 2/2019 | King | G09B 5/08 |
| 2019/0087558 A1* | 3/2019 | Mercury | G06N 20/00 |
| 2019/0089701 A1* | 3/2019 | Mercury | G06F 16/285 |
| 2019/0304188 A1* | 10/2019 | Bridgeman | G09B 5/02 |
| 2020/0273365 A1* | 8/2020 | Wallace | G06F 3/016 |
| 2020/0314489 A1* | 10/2020 | Thielen | H04N 21/44218 |

* cited by examiner

SYSTEM FOR CAREER TECHNICAL EDUCATION

CROSS-REFERENCE TO RELATED APPLICATIONS

This non-provisional patent application claims the benefit of the provisional application filed with the U.S. Patent and Trademark Office as Application No. 62/698,333 entitled CTE LEARNING PLATFORM, filed Jul. 16, 2018.

FIELD OF INVENTION

The present invention relates generally to a System for Career Technical Education, and, more specifically, the present invention relates to a System to provide career technical education (CTE) to multiple users

BACKGROUND OF INVENTION

In some industries, practitioners require a certification to practice in the respective industry. To obtain the industry certification, an applicant typically takes classes for career technical education (CTE) in the respective industry's field and then passes an industry certification exam to prove mastery in the relevant field.

Many of today's professionals and technical specialists are required to acquire continuing education and training in their area of expertise in order to keep abreast of current technology. To ensure that the individual has mastered the course material, a test is given to verify their understanding of the course material. One method that is used to confirm that an individual is achieving the required amount of contact hours for an on-line course is to record the time spent on the course. For example, for on-line video or audio presentations, a user may be prompted for an acknowledgement (e.g. a password or other identifier) that the user is actually paying attention to the course.

The various professions that require education for an individual to maintain professional credentials often require documentation of the individuals attendance and satisfactory understanding of the course. Individuals therefore must participate in approved continuing education training programs, accruing a specified number of hours of training over a given period of time in order to maintain their professional certification. Approval is typically given by the profession's licensing body, governing body or governmental office. The training and education are often measured in credit hours. The entire effort is often referred to as continuing education, although specific professions often have specific terms, such as continuing medical education (CME) or continuing legal education (CLE), or continuing professional development (CPD).

Continuing education credits can be obtained from a variety of sources, traditionally from attending professional seminars, viewing video presentations on professional topics, or reading refereed journal articles. Credits can be earned by ensuring that the individual is attentive to the course by responding to a question, such as with a keystroke, at various times to confirm that the individual is present and watching or listening to the presentation and thereby earning his or her credit.

For that credit to be registered with the individual's licensing body, the individual or the course presenter must provide identification of both the course and the individual and proof of completion to the licensing body. Identification of the course often includes the name, topic and approval information of the course. Identification of the individual often includes the name, professional registration or similar code number, work information, and mailing information. On-line continuing education providers can provide users with a printable certificate to help them document their credits earned, or may provide an on-line logbook to assist the user in keeping track of their credits. Other methods of providing this proof to the accrediting or licensing body is for the provider or the individual to send a hardcopy of the proof that the individual is entitled to the credits by mail, by sending copies of the questions and answers, or by transmitting this information via e-mail.

Many professions require continuing education to be obtained over the Internet by reading materials (on-line, off-line, or in print media), following a case simulation or following a video or audio presentation. Simulations can be linear, or can be designed for individual interaction. Video and audio presentations may be recorded, real-time or a combination of both. Such presentations may be downloaded by the individual for viewing or listening at a more convenient time, or viewed or listened to by online media streaming. Lectures and discussions may be done using Internet communication technologies as part of the continuing education course. It is foreseeable that actual procedures will be at least viewable using the Internet, and may offer interactivity where individuals can earn credits for "sitting in" on procedures virtually.

In some cases, tests are required to confirm completion of the course, and grading may occur on-line or via a mail-in form. Using the Internet to provide continuing education benefits both the professional and the provider. The professional is not required to travel, often has greater selection of courses, and can often obtain the credit at a lower cost than other sources. The provider can reach a greater audience, minimize publishing costs, and automate presentation, testing, grading, notification and payment.

Some licensures and certifications require regular testing and renewal. In addition to maintaining credentials, career development is often a goal of professional education, particularly in improvement of business or technology skills. We refer to any effort made to seek further education or training on one's profession to be continuing education, with emphasis and focus on those professions where such efforts are needed to remain in practice. The industries where one would find such professions include, for example, medical and healthcare; Legal and Regulatory; Accounting, Finance, Investment, Banking, and Insurance Real Estate. This is not an exhaustive list, as many organizations and professions change their criteria for professionalism, certification, and licensure.

SUMMARY OF THE INVENTION

According to an embodiment of the present invention, there is disclosed a System for Career Technical Education to provide career technical education (CTE) to multiple users. The System for Career Technical Education includes an education center that is interconnected through a server. Multiple user interface apparatuses communicate with the server through a data communication network. A computer database is connected to the server that stores gathered data from multiple users utilizing the multiple user interface apparatuses. A Learn phase module is included in which the education center presents online videos to the multiple user interface apparatuses via the data communication network to teach skills to the multiple users. An Apply phase module is included in which the education center enables the multiple users to apply the skills. A Create phase module is included in which the education center enables the multiple users to use the taught-and-applied skills to create a virtual reality experience within the server as proof of the user's mastery of the taught-and-applied skills. A certifying agency system connected to the server receives the proof of the user's mastery of the taught-and-applied skills from the education center.

According to a further embodiment of the present invention, there is disclosed a System for Career Technical Education to provide career technical education (CTE) to multiple users. The System for Career Technical Education includes an education center including system memory, an operating system, application programs, a graphical user interface, a processor, and storage that is interconnected through a server. Multiple user interface apparatuses communicate with the server through a data communication network. A computer database is connected to the server that stores gathered data from multiple users utilizing the multiple user interface apparatuses. An education resource interface directed to presenting the multiple users access to the education center through the server. A Learn phase module is included in which the education center presents online videos to the multiple user interface apparatuses via the data communication network to teach skills to the multiple users. An Apply phase module is included in which the education center enables the multiple users to apply the skills. A Create phase module is included in which the education center enables the multiple users to use the taught-and-applied skills to create a virtual reality experience within the server as proof of the user's mastery of the taught-and-applied skills. A certifying agency system is connected to the server that receives the proof of the user's mastery of the taught-and-applied skills from the education center.

BRIEF DESCRIPTION OF THE DRAWINGS

The structure, operation, and advantages of the present invention will become further apparent upon consideration of the following description taken in conjunction with the accompanying figures (Figures). The figures are intended to be illustrative, not limiting.

Certain elements in some of the figures may be omitted, or illustrated not-to-scale, for illustrative clarity. The cross-sectional views may be in the form of slices, or near-sighted cross-sectional views, omitting certain background lines which would otherwise be visible in a true cross-sectional view, for illustrative clarity.

Often, similar elements may be referred to by similar numbers in various figures (Figures) of the drawing, in which case typically the last two significant digits may be the same, the most significant digit being the number of the drawing figure (Figure).

FIG. 1 is a block diagram of a system for providing career technical education (CTE) to a user, in accordance with the present invention.

FIG. 2 is a block diagram chart representing the functional stages performed by the System for Career Technical Education, in accordance with the present invention.

FIG. 3 is a block diagram chart representing the method of use of the System for Career Technical Education, in accordance with the present invention.

DETAILED DESCRIPTION OF THE PREFERRED EMBODIMENT

Figure 1:
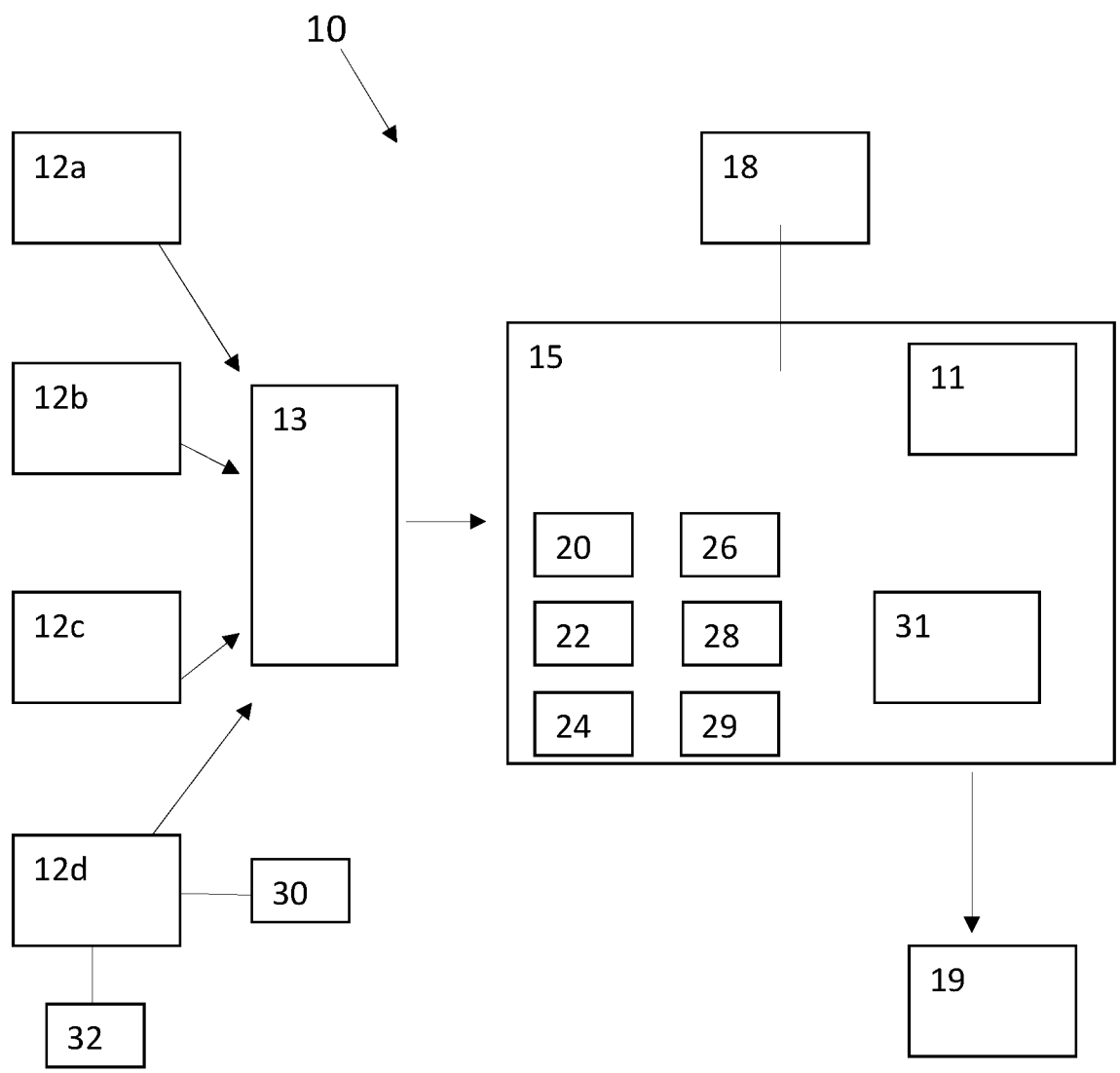

In the description that follows, numerous details are set forth in order to provide a thorough understanding of the present invention. It will be appreciated by those skilled in the art that variations of these specific details are possible while still achieving the results of the present invention. Well-known processing steps are generally not described in detail in order to avoid unnecessarily obfuscating the description of the present invention.

In the description that follows, exemplary dimensions may be presented for an illustrative embodiment of the invention. The dimensions should not be interpreted as limiting. They are included to provide a sense of proportion. Generally speaking, it is the relationship between various elements, where they are located, their contrasting compositions, and sometimes their relative sizes that is of significance.

In the drawings accompanying the description that follows, often both reference numerals and legends (labels, text descriptions) will be used to identify elements. If legends are provided, they are intended merely as an aid to the reader, and should not in any way be interpreted as limiting.

The System and Method for Career Technical Education 10 relates to methods and apparatuses for providing career technical education (CTE) to a user, such as for example a student or an applicant requiring a certification, for preparing the user to receive an industry certification, a credential or a college credit, or for conferring an industry certification, credential or college credit to the user.

In general terms, the System for Career Technical Education 10 provides an integrated professional services research, resource, and education delivery and management system. The invention provides a common entry point for education and training products and services and integrates professional resource and practice management systems with professional education, training, requirements and reporting systems. Through integration, the System for Career Technical Education 10 provides a more efficient and effective learning environment fully integrated in the practice of a given profession. The invention provides an integrated system that promotes a learning environment that more quickly advances and cultivates the skills of professionals and more closely relates and monitors such development with engagements, practice areas and specialties, and licensure jurisdictions associated with individuals.

As illustrated in FIG. 1, the System for Career Technical Education 10 is designed for providing career technical education (CTE) to a user. The system 10 includes an education center 15, that is interconnected through a server 11 and multiple user interface apparatuses 12 for multiple users, including any number such as 12*a*, 12*b*, 12*c* and 12*d* (12*a*-12*d*). Each user interface apparatus 12 communicates with the server 11 through a data communication network 13. The data created is stored on a computer database 18. The network 13 might be the Internet, in which case the educational apparatuses are online. A certifying agency system 19, such as a bar association, receives the results of the users 12*a*-12*d* from the education center 15.

In general terms, the multiple users 12*a*-12*d* may connect to the education center 15 using a mobile or local device, such as a wireless-enabled notebook computer or network-connected desktop computer or other suitable machine via a communication link, such as the Internet, Ethernet, WLAN, WAN or other suitable data communication network 13. The users 12*a*-12*d* interact with the education center 15 through the server 11 to study and learn educational information from various courses provided by the education center. The multiple users 12*a*-12*d* will create profiles within the education center 15, which are transferred through the data communication network 13 and stored within the database

18. In turn, the multiple users 12a-12d can access education courses by connecting to the education center 15 through the data communication network 13.

The education center 15 may comprise a typical combination of hardware and software including system memory 20, operating system 22, application programs 24, graphical user interface (GUI) 26, processor 28, and storage 29. The operating system 22 shall be suitable for use with the Career Technical Education functionality described herein, for example, Microsoft Windows. Also, the Career Technical Education software may be browser-based and/or may include custom integration with Microsoft Office applications, e.g., Outlook, Word and Excel.

The software and related tools, procedures, forms and data used to implement the Career Technical Education processes may be accessed by the users 12a-12d via the Internet or it may be accessed via CD-ROM or other media or a combination of such means. The education center 15 includes an education resource interface 31, such as a web-page, directed to presenting users who are authorized to access the system through the server 11, with information, links, etc., concerning education and training.

The education center 15 utilizes a server 11 that is connected to other components of the System for Career Technical Education 10 through the data communication network 13 and responds to input data from one of the users 12a-12d. As is known in the art, the server 11 at the education center 15 includes non-transitory program storage device capable by a machine, tangibly embodying a program of educational courses. Further, the server 11 includes computer readable data storage media such as hard disk drives and RAM memory that store program instructions and data. Using such stored programs, the education center 15 can run application programs that respond to input data.

The data communication network 13, may be any type of electronically connected group of computers including, for instance, the following networks: Internet, Intranet, Local Area Networks (LAN), Wide Area Networks (WAN) or an interconnected combination of these network types. Obviously, the data communication network 13 includes the Internet, which generally connects a plural of users in accordance with a client-server model.

Communications within the data communication network 13 and to or from the user's 12 computing and mobile computing devices 30 and 32, respectively, connected to the network may be either wired or wireless. The computing devices 30, such as desktop 30a or laptop computer stations 30b, as well as the mobile computing devices 32, such as a cell phone 32a, a smart phone 32b, a tablet 32c, a PDA 32d, or other mobile communications devices, are capable of sending and receiving data over the data communication network 13. Each of the computing devices 30 as well as mobile communications device 32 may include a processor, network interface circuitry, and memory. In an alternative embodiment, the data network 20 may be presented via a secure virtual private network (VPN) connection.

Figure 2:
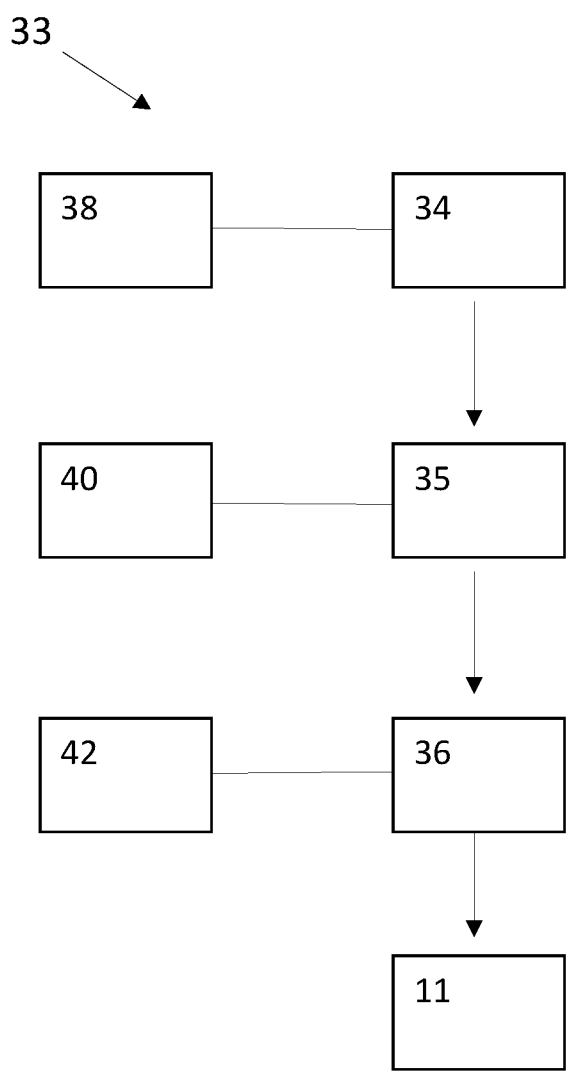

FIG. 2 is a flow chart representing the functional stages 33 performed by the System for Career Technical Education 10. The stages 33 includes successive phases—a Learn phase 34, an Apply phase 35, and a Create phase 36. These phases are performed by the education center 15, and provided through the server 11, which are accessible via the data communication network 13 by the users 12a-12d.

The Learn phase 34, an Apply phase 35, and a Create phases 36 are provided as modules, including hardware (devices and applications) programmed to provide interactive lessons, interactive practice sessions and interactive tests. These interactive lessons, sessions and tests may be used by the users 12a-12d to prepare the user to pass an industry certification exam or an exam for college credit. Alternatively, these interactive lessons, sessions and tests may be used by a certifying agency to certify the user or by a college to confer the college credit.

The Learn phase 34 is implemented by the Learn module 38 of the user's computing and mobile computing devices 30 and 32. The computing devices 30 and 32 present online videos that the apparatus receives from the server over the data communication network 13. A video (video content) might be of a lecturer (teacher, speaker) delivering a lecture (lesson), with closed caption transcription text that is displayed under the lecturer and matches what the educator is saying, and breakaways showing scenes and images that illustrate what the lecturer is speaking about while the lecturer is speaking in the video. The user 12 demonstrates understanding of the concepts taught in each video of the Learn phase by answering questions at the end of the respective video to demonstrate mastery. Each time the user 12 answers questions, the system tracks and stores the user interactions (responses) with the concepts within the computer database 18 stored on the server 11. This information can be used by the education center 15 to track the user's skill progression.

Each video, of the lesson videos in the Learn phase, might include text on the screen as a transcript for users who are deaf or hard of hearing. The video may include an actor, quick writing on screen, images and a mix of design elements designed to keep the users engaged.

A video in the Learn phase might be approximately 120 seconds long and might include animated video modeling of each objective. Text of the Learn phase's materials might fit in one screen with images, etc. The video script might use a standard video screen template. On the video interface, the user might be able to modify the play speed and view transcript and access resources as necessary.

The user might be presented with one or more key questions dealing with the topic of the lesson. Questions might align with the objective of the lesson. The user might respond to questions that are presented after the brief animated video to ensure mastery of a particular objective. Each question might have scaffolding hints that help the user answer the question correctly. Hints might address common errors and common misconceptions about a particular topic.

The Apply phase 35 is implemented by the Apply module 40 of the user's computing and mobile computing devices 30 and 32. In the Apply phase 35, the user 12 applies his/her skills by engaging in web based virtual reality simulations through a series of performance-based tasks. The user 12 interacts with the mobile computing devices 30 and 32 of the apparatus. The computing devices 30 and 32 presents scenarios to the user 12 and enables the student to provide feedback by keypad (keyboard) and touchscreen. The interaction device might further include a virtual reality head-mounted headset (WebVR) along with hand/finger sensors that presents the student with a series of scenarios via the headset and enables the student to provide feedback via the hand/finger sensors.

In the Apply phase 35, the computing devices 30 and 32 provides simulations in which the Apply module 40 of the apparatus records how the student responds to different scenarios that are presented to the student relating to what the student learned in the Learn phase. The Apply module 40 might help the user 12 master the relevant subject, so as to be better prepared for taking a certification exam. Also, the education center 15 tracks (records) the user's interaction with applying the concepts and stores the results within the server 11.

The Apply module 40's recording of the student's performance might be used as part of a certification exam, for an evaluating expert (evaluator) to assess (evaluate) whether the student should be granted an industry certification, and/or how well the student is prepared to pass an industry certification exam. Each time the user 12 answers the questions, the education center 15 tracks and stores the user interactions with the concepts within the computer database 18 of the server 11. This information can be used to track skill progression.

The Apply module 40 comprises an application where he/she demonstrates his/her understanding of the concepts of the lesson, or a series of lessons. The simulations might be rendered in 2D and 3D. The Apply module 40 might provide the user with an experience similar to what he/she would experience in his/her field of study. The experience may include some VR (virtual reality) and AR (augmented reality), allowing the user to practice the skills necessary to perform the tasks. The user 12 might engage in a first person simulation that has him/her performing a series of tasks that directly align with a certification blueprint. Once the task is mastered, the user 12 might go back and practice the skills as necessary. The Apply module 40 might use 360 degree video.

During the Apply phase 35, the user 12 might engage in CTE explorations that challenges him/her to apply career thinking to authentic problems and investigate CTE application from a certification test blueprint. The explorations encourage the user 12 to wrestle with complex challenges, such as to explore problems and identify strategies to solve those problems. In that process, the user 12 draws upon prior knowledge of CTE concepts and skills, learns new concepts and skills at point of need, formulates probing questions, and perseveres to solutions. The Apply concepts might be directly linked to the performance tasks detailed on the certification exams.

The system might use virtual reality to generate realistic images, sounds and other sensations that simulate a student's user's presence in a virtual environment. This might allow the user to participate in performance-based tasks as if he/she is actually there. The simulations offer practice runs at techniques, designs, and ideas.

After the user has mastered the Learn concepts and the Apply concepts, the user progresses to the Create phase 36.

The Create phase 36 is implemented by the Create module 42 of the user's computing and mobile computing devices 30 and 32. The Create module 42 includes devices (hardware) configured and programmed, typically the computing and mobile computing devices 30 and 32, to enable the user 12 to create his/her own virtual reality experience. The Create module 42 provides an interface in which the user 12 can (1) upload a short video clip and (2) add his/her own questions to test for knowledge and (3) publish the experience. The apparatus requests (arranges for) the user to demonstrate his/her mastery of a performance task by creating evidence to support his/her ability to perform skills necessary for certification. The Create module 42 allows the user to upload his/her own virtual reality (WebVR) simulation to the server 11 via the data communication network 13, thereby demonstrating his/her ability to complete performance tasks required for the industry certification.

After the user 12 has mastered the CTE Apply phase 35, a short video, of perhaps 30 seconds or less, might appear where a CTE expert will ask the user to demonstrate a specific performance task with a set of instructions, via the data communication network 13. The user 12 will have the opportunity to demonstrate his/her ability by creating their own VR experience to demonstrate their understanding. The user 12 might the ability to create his/her own 3D view using the computing and mobile computing devices 30 and 32. The user 12 might upload information to the education center's 15 server 11, to review and practice. The Create interface allows the user to create his/her own WebVR simulation to display the user's ability to perform a task. The uploaded information might be a standard video or 360 degree video. After uploading the video, the user 12 might have the opportunity to create a series of questions or hotspots linked to different parts of the video. The user 12 might publish the video for others to engage with.

The above embodiment includes the Learn phase 34, Apply phase 35, and Create phase 36. Alternatively, the Learn phase 34 might be omitted and replaced by the user learning the concepts another way.

Figure 3:
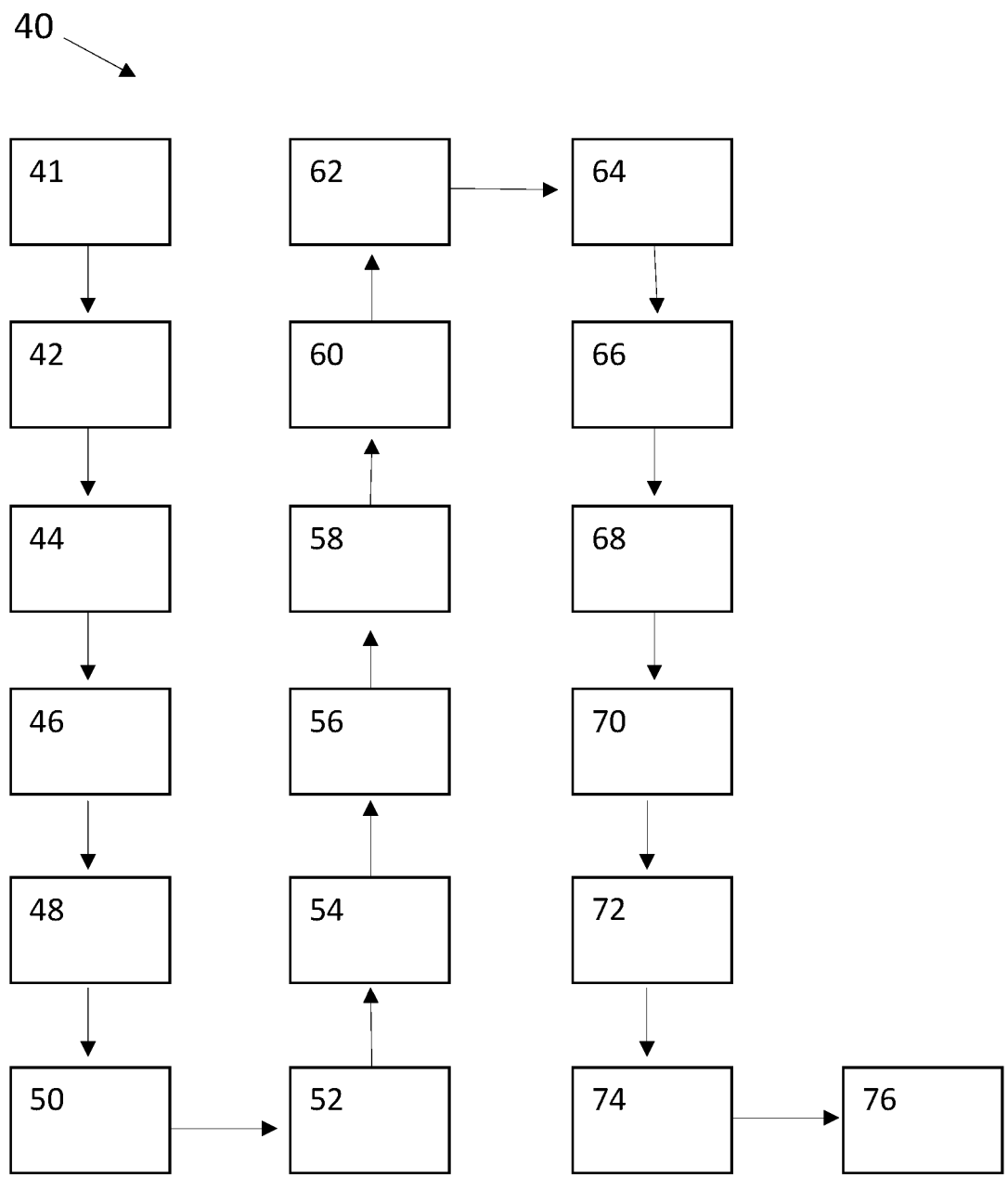

FIG. 3 illustrates the method 40 of the education center 15 providing a continuing education course based on electronically identifying and qualifying a user 12. This embodiment matches an appropriate course to the user 12. Once the user 12 has successfully completed the study of a course, a mechanism is provided for transmission of evidence that the individual has successfully completed the continuing education course on-line.

In another embodiment, for an user 12 to obtain continuing education credits, the provider of the continuing education course may obtain the identity of the user 12 and the course the individual intends to take. As shown in FIG. 2, the user 12, starts as shown in Block 41 and provides a profile that includes his or her identity. Additional information may be required to create a richer profile of the user.

In the present state of the art on the Internet, the user types this information into a form on the provider's site, although other media may allow different methods of identifying the individual. Identification may be remembered by the user's computer for automatic identification at a later session; so currently, this is done through use of "cookies." User may select the course first, or sign up first. Signing up includes providing a profile that includes various professional demographics and other qualification characteristics (described below).

As information about an individual becomes more invisibly embedded in the communication systems (e.g. the individual's computer, television, phone, service provider), the individual may not overtly or purposefully provide the information, yet the communication system does this automatically. In other words, electronic identifiers may be present in the communication system of the user. Currently, the most common identifiers are cookies, telephone numbers and IP addresses. Identification may also being done via systems that use biological or physiological methods in more sophisticated systems.

Next, as shown in block 42, the user 12 can log in and then select a course of study in Block 44.

The user 12 can next select a method of payment in Block 46. A further method of identification of the individual may be done by credit card verification. In one embodiment of the invention, the users are requested to provide valid credit card information as a method of assuring that the individual is honestly representing his identity. The credit card identification may occur by way of payment for a continuing education course, or may be verified without any payment by the individual occurring. Accurate identification of the individual is beneficial in that course providers are concerned that the individual receiving the continuing education is the same as the individual taking the course. Once the course is paid for, it is present in block 48 to be taken by the user 12.

In Block 50, the user 12 takes the desired course in the Learn phase 34. In Block 52, a video (video content) might be of a lecturer (teacher, speaker) delivering a lecture (lesson), with closed caption transcription text that is displayed under the lecturer and matches what the educator is saying, and breakaways showing scenes and images that illustrate what the lecturer is speaking about while the lecturer is speaking in the video. In Block 54, the user 12 demonstrates understanding of the concepts taught in each video of the Learn phase by answering questions at the end of the respective video to demonstrate mastery. In Block 56, each time the user 12 answers questions, the system tracks and stores the user interactions (responses) with the concepts within the computer database 18 stored on the server 11. This information can be used by the education center 15 to track the user's skill progression.

Then, in Block 58, in the Apply phase 35, the user 12 demonstrates his/her ability to complete performance tasks required for the industry certification. In Block 60, the Apply module 40 provides the user 12 with an experience similar to what he/she would experience in his/her field of study. The experience may include some VR (virtual reality) and AR (augmented reality), allowing the user to practice the skills necessary to perform the tasks. In Block 62, the user 12 engages in a first person simulation that has him/her performing a series of tasks that directly align with a certification blueprint. Once the task is mastered, the user 12 might go back and practice the skills as necessary. The Apply concepts might be directly linked to the performance tasks detailed on the certification exams.

Then, in Block 64, in the Create phase 36, the user 12 can (1) upload a short video clip and (2) add his/her own questions to test for knowledge and (3) publish the experience. In Block 66, the education center 15 requests through the server 11 for the user 12 to demonstrate his/her mastery of a performance task by creating evidence to support his/her ability to perform skills necessary for certification. In Block 68, the user 12 uploads his/her own virtual reality (WebVR) simulation to the server 11 via the data communication network 13, thereby demonstrating his/her ability to complete performance tasks required for the industry certification. In Block 70, after uploading the video, the user 12 might have the opportunity to create a series of questions or hotspots linked to different parts of the video. In Block 72, the user 12 might publish the video for others to engage with.

Once the course is successfully completed, the user may print a certificate of completion in block 74. Next in block 76, the licensing or education body can be notified of the user's successful completion of the course.

Continuing education credit is earned upon completion of the course requirements. The credit itself is conferred by the licensing body or association of the user. Different licensing bodies have different requirements for how evidence is to be presented to them, and therefore the provider of the continuing education course may notify the licensing body via hard copy, e-mail, data interchange, or other form of communication. Reporting may occur for each individual, or may occur for a group of individuals.

In one embodiment of this invention, the completion evidence is written to a database denoting the individual's identity. Completion evidence may include the time spent on the course, the grades of the test, or the answers for the test. This evidence is then reported to the licensing body as appropriate to that body's requirements. Users 12 may be given the option to print out a certificate, should the user have the necessary hardware. This hardcopy certificate may be useful to the user in providing evidence of course completion, as some licensing bodies or employers may require printed evidence.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

The invention claimed is:

1. A System for Career Technical Education to provide career technical education (CTE) to multiple users, comprising:

an education center that is interconnected through a server;

multiple user interface apparatuses that communicate with the server through a data communication network;

a computer database connected to the server that stores gathered data from the multiple users utilizing the multiple user interface apparatuses;

a Learn phase module in which the education center presents online videos to the multiple user interface apparatuses via the data communication network to teach skills to the multiple users;

an Apply phase module in which the education center enables the multiple users to apply the skills, wherein the Apply phase module comprises:

a virtual reality head-mounted headset; and a plurality of finger sensors configured and disposed to provide feedback to the server from a user from the multiple users;

a Create phase module in which the education center enables the multiple users to use the taught-and-applied skills to create a virtual reality experience within the server as proof of the user's mastery of the taught-and-applied skills; and a certifying agency system connected to the server that receives the proof of mastery of the taught-and-applied skills from the education center for the user from the multiple users, and wherein the Create phase module further enables:

saving the virtual reality experience as a 360 degree video on the server;

obtaining a plurality of questions, wherein each question of the plurality of questions are linked to a part of the video, and wherein each question is provided by the user from the multiple users, for testing knowledge of one or more additional users from the multiple users;

publishing the video and questions to enable the multiple users to engage with the video;

and wherein the system further enables printing a certificate of completion.

2. The System for Career Technical Education of claim 1, wherein the data communication network is selected from a group consisting of Internet, Ethernet, WLAN, and WAN.

3. The System for Career Technical Education of claim 2, wherein the education center comprises a combination of hardware and software including system memory, an operating system, application programs, a graphical user interface, a processor, and storage.

4. The System for Career Technical Education of claim 3, wherein the education center includes an education resource interface directed to presenting the multiple users who are authorized to access the system through the server, with the career technical education.

5. The System for Career Technical Education of claim 4, wherein the Learn phase module implements a Learn phase to present online videos to computing and mobile computing devices of the multiple users.

6. The System for Career Technical Education of claim 5, wherein the education center tracks and stores interactions of the multiple users with the Learn phase module within the computer database stored on the server.

7. The System for Career Technical Education of claim 6, wherein the Apply phase module implements an Apply phase for the multiple users to engage in web based virtual reality simulations through a series of performance-based tasks on the multiple users' computing and mobile computing devices.

8. The System for Career Technical Education of claim 7, wherein the education center tracks and stores the multiple users' interactions with the Apply phase module within the computer database stored on the server.

9. The System for Career Technical Education of claim 8, wherein the multiple users' interactions within the computer database stored on the server are used as part of a certification exam by the certifying agency system.

10. The System for Career Technical Education of claim 8, wherein the multiple users upload the virtual reality experience to the server via the data communication network, thereby demonstrating ability to complete performance tasks required by the certifying agency system.

11. The System for Career Technical Education of claim 1, wherein the virtual reality experience includes a WebVR simulation.

12. A System for Career Technical Education to provide career technical education (CTE) to multiple users, comprising:
an education center including system memory, an operating system, application programs, a graphical user interface, a processor, and storage that is interconnected through a server;
multiple user interface apparatuses that communicate with the server through a data communication network;
a computer database connected to the server that stores gathered data from the multiple users utilizing the multiple user interface apparatuses;
an education resource interface directed to presenting the multiple users access to the education center through the server;
a Learn phase module in which the education center presents online videos to the multiple user interface apparatuses via the data communication network to teach skills to the multiple users;
an Apply phase module in which the education center enables the multiple users to apply the skills, wherein the Apply phase module comprises:
a virtual reality head-mounted headset; and
a plurality of finger sensors configured and disposed to provide feedback to the server from a user from the multiple users;
a Create phase module in which the education center enables the multiple users to use the taught-and-applied skills to create a virtual reality experience within the server as proof of the user's mastery of the taught-and-applied skills; and
a certifying agency system connected to the server that receives the proof of mastery of the taught-and-applied skills from the education center for the user from the multiple users, and wherein the Create phase module further enables:
saving the virtual reality experience as a 360 degree video on the server;
creating a plurality of questions, wherein each question of the plurality of questions are linked to a part of the video, and wherein each question is provided by the user from the multiple users, for testing knowledge of one or more additional users from the multiple users;
publishing the video to enable accessing of the video by the multiple users; and
wherein the system further enables printing a certificate of completion.

13. The System for Career Technical Education of claim 12, wherein the data communication network is selected from a group consisting of Internet, Ethernet, WLAN, and WAN.

14. The System for Career Technical Education of claim 13, wherein the Learn phase module implements a Learn phase to present online videos to computing and mobile computing devices of the multiple users.

15. The System for Career Technical Education of claim 14, wherein the education center tracks and stores interactions of the multiple users with the Learn phase module within the computer database stored on the server.

16. The System for Career Technical Education of claim 15, wherein the Apply phase module implements an Apply phase for the multiple users to engage in web based virtual reality simulations through a series of performance-based tasks on computing and mobile computing devices of the multiple users.

17. The System for Career Technical Education of claim 16, wherein the education center tracks and stores interactions of the multiple users with the Apply phase module within the computer database stored on the server.

18. The System for Career Technical Education of claim 17, wherein interactions of the multiple users within the computer database stored on the server are used as part of a certification exam by the certifying agency system.

19. The System for Career Technical Education of claim 12, wherein the multiple users upload the virtual reality experience to the server via the data communication network, thereby demonstrating ability to complete performance tasks required by the certifying agency system.

* * * * *